United States Patent [19]

Moss et al.

[11] Patent Number: 4,880,845

[45] Date of Patent: Nov. 14, 1989

[54] AMINO/ORTHO CARBOXYLIC ACID ESTER CATALYST SYSTEM FOR ISOCYANATE TRIMERIZATION

[75] Inventors: Christopher T. Moss, Dublin; Timothy A. Tufts, Powell, both of Ohio; Robert S. Bock, Hazelwood, Mo.

[73] Assignee: Ashland Oil, Inc., Ashland, Ky.

[21] Appl. No.: 277,873

[22] Filed: Nov. 30, 1988

[51] Int. Cl.$^4$ .............................................. C08G 18/14
[52] U.S. Cl. ..................................... 521/114; 521/128; 521/129; 528/48; 528/49; 528/52; 528/53; 528/54
[58] Field of Search ...................... 521/114, 128, 129; 528/48, 49, 52, 53, 54

[56] References Cited

U.S. PATENT DOCUMENTS 4,115,300  9/1978  Chakinof ............................ 521/114

*Primary Examiner*—Maurice J. Welsh
*Attorney, Agent, or Firm*—Mueller and Smith

[57] ABSTRACT

The present invention is directed to an isocyanate-functional composition useful for forming a coating, adhesive, elastomer, or like article. Cure of the composition preferably involves trimerization of the isocyanate groups in the presence of an amino catalyst including a tertiary amine, an amine salt, and quaternary ammonium salts. The novel catalyst system used in achieving cure of the isocyanate-functional compound-containing liquid curable composition comprises an amino catalyst and an ortho-carboxylic acid ester.

17 Claims, No Drawings

AMINO/ORTHO CARBOXYLIC ACID ESTER CATALYST SYSTEM FOR ISOCYANATE TRIMERIZATION

BACKGROUND OF THE INVENTION

The present invention relates to curing of isocyanates in the presence of amino catalysts and more particularly to the novel use of ortho carboxylic acid esters as co-catalysts therefor.

Quaternary ammonium salts are known to be efficient trimerization catalysts and are known to be effective in making isocyanurate-type polyisocyanates. Trimerization of isocyanates into isocyanurates is a reaction that can be continued for formation of coatings, adhesives, elastomers and plastics, and like products. The trimerization reaction usually requires some heat even in the presence of quaternary ammonium catalysts.

The predominant form of the quaternary ammonium catalyst comprises quaternary ammonium hydroxide salts as proposed by German Pat. No. 1,150,080. U.S. Pat. No. 3,487,080 proposes trimerization of isocyanates in the presence of quaternary ammonium hydroxides plus a compound selected from a phenol, an oxime, or methanol. U.S. Pat. No. 4,040,992 conducts the trimerization reaction utilizing shortened carboxylic acid salts of quaternary ammonium hydroxyl compounds. U.S. Pat. No. 3,179,626 proposes the use of tertiary amines in combination with aldehydes in the preparation of polyurethanes, polyisocyanurates, and polyureas.

In some uses such as structural foams and reaction injection moldings (RIM polyurethanes), it is desired that the catalyst system exhibit a controlled induction period. That is, the curable composition should have a specified period of time during which virtually no viscosity increase is evident. This permits the composition to be placed in a mold or penetrate through reinforcement fiber and adequately wet the fiber, for example, prior to the composition reaching its gel point and curing. Once the gel point has been reached, however, cure should be fairly rapid. The use of acids, for example, as noted above is one method for achieving the delay in cure of the curable composition.

BROAD STATEMENT OF THE INVENTION

The present invention is directed to an isocyanate-functional composition useful for forming a coating, adhesive, elastomer, or like article. Cure of the composition preferably involves trimerization of the isocyanate groups in the presence of an amino catalyst including a tertiary amine, an amine salt, and quaternary ammonium salts. The novel catalyst system used in achieving cure of the isocyanate-functional compound-containing liquid curable composition comprises an amino catalyst and an ortho-carboxylic acid ester.

Another embodiment of the present invention involves the incorporation of an active-hydrogen compound in combination with the isocyanate-functional compound wherein excess isocyanate groups are contained in the composition. In such formulation, the amino catalyst desirably is included in the polyol package while the ortho-carboxylic acid ester co-catalyst is contained in the isocyanate package. Upon admixing of the two packages, cure ensues.

Yet another aspect of the present invention involves the formation of isocyanate-functional pre-polymers wherein a polyisocyanate is reacted with a polyol or other active hydrogen-containing compound wherein the ratio of isocyanate groups to hydroxyl groups is much greater than 1. Such prepolymer is formed utilizing the amino catalyst/ortho-carboxylic acid ester co-catalyst system of the present invention.

Advantages of the present invention include the ability to provide a controlled induction period during which time little viscosity increase of the liquid curable composition is evident. Following the gelation of the composition, however, relatively rapid cure of the composition ensues. An advantage of the controlled induction period prior to the trimerization reaction is the ability to mold relatively large parts. These and other advantages will be readily apparent to those skilled in the art based upon the disclosure herein.

DETAILED DESCRIPTION OF THE INVENTION

Ortho-carboxylic acids are defined as organic acids containing one additional molecule of water in chemical combination. Ortho-carboxylic acids typically are known in their ester form. Since trimerization, like other isocyanate reactions, is base catalyzed, acid stabilizers or inhibitors have been known in the art. Thus, the use of an aldehyde or carboxylic acid salt form of an amine catalyst in isocyanate trimerization reactions can be seen to result in achieving a delay in the reaction, or so-called induction period. However, it was quite unexpected to discover that ortho-carboxylic acid esters would interact with amino catalysts for providing useful induction periods. The literature appears to be silent with respect to documenting an interaction between amino compounds and ortho-carboxylic esters. Nevertheless, the Examples will amply demonstrate that the presence of ortho-carboxylic acid esters does have the desired effect on the isocyanate trimerization reaction compared to equivalent formulations lacking the presence of the ortho-carboxylic acid esters. Thus, while the underlying reaction mechanism is not understood, the effect of the presence of the ortho-carboxylic acid esters in combination with amino catalysts is readily apparent.

A variety of ortho-carboxylic acid esters are known. For efficiency and economy, most ortho-carboxylic acid esters will be based on lower carboxylic acids, e.g. formic acid, acetic acid, propionic acid, and the like. Ortho-carboxylic acid esters include, for example, ortho-carbonic acid tetraethyl ester (tetraethoxy methane), ortho-carbonic acid tetrapropyl ester (tetrapropoxy methane), ortho-formic acid triethyl ester (triethoxy methane), ortho-formic acid triisobutyl ester (triisobutoxy methane), orthoformic acid triisopropyl ester (triisopropoxy methane), ortho-formic acid trimethyl ester (trimethoxy methane), ortho-formic acid tri(3-methyl butyl) ester (triisoamyl orthoformate), ortho-formic acid triphenyl ester (triphenoxy methane), ortho-formic acid tripropyl ester (tripropoxy methane), ortho propionic acid triethyl ester (1,1-triethoxy propane), and the like and mixtures thereof. The proportion of ortho-carboxylic acid ester included in the reaction mixture broadly can range from about 0.1% by weight to about 20% by weight of the reaction mixture with practical levels typically ranging from about 3 to 5 percent by weight.

Referring to the amino catalyst useful in isocyanate trimerization cure, quaternary ammonium salts appear to be the catalyst of choice in the art as described in the background section above. This art also teaches that the quantity of catalyst ranges from about 0.001 to about 5 percent by weight of the isocyanate involved. A preferred amine catalyst comprises 1,8-diazobicyclo(5.4.0)undec-7-ene, especially in salt or quaternary ammonium form. Additional tertiary amines for basing a catalyst upon include, for example, trimethyl amine, tetraethyl amine, dimethyl benzyl amine, dimethyl cyclohexyl amine, dimethyl-n-hexyl amine, beta-hydroxyl ethyl dimethyl amine, pyridine, dodecyl dimethyl amine, N,N-dimethyl cyclohexyl amine, N-methyl pyrrolidine, N-methyl morpholine, and the like and mixtures thereof.

Referring now to the isocyanate-functional compound, an isocyanate-functional monomer, oligomer, or polymer which can be cured by trimerization is appropriate for use in accordance with the precepts of the present invention. That is, while isocyanate-functional oligomers and polymers (e.g. so-called moisture curable urethanes) can be used, it also is appropriate to use isocyanate monomers which can be trimerized into the corresponding isocyanurate which then cures into the final polymeric network.

Broadly, polyisocyanates will have from about 2–4 isocyanate groups per molecule for use in the composition of the present invention. Suitable polyisocyanates include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris(4-isocyanatophenyl)thiophosphate, cyclohexane diisocyanate (CHDI), bis(isocyanatomethyl)cyclohexane ($H_6$XDI), dicyclohexylmethane diisocyanate ($H_{12}$MDI), trimethylhexane diisocyanate, trimethyl hexamethylene diisocyanate, dimer acid diisocyanate (DDI) e.g. lysine diisocyanate and its methyl ester, isophorone diisocyanate, methyl cyclohexane diisocyanate, 1,5-naphthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

Conventional moisture-curable polyurethane coatings typically contain levels of free isocyanate groups ranging from about 1–5% by weight. While such compositions are designed to cure by the absorption of moisture into an applied film thereof, such compositions also can be cured by trimerization in accordance with the present invention. "Moisture-curable polyurethane coating compositions" comprehend an isocyanate-terminated prepolymer containing between about 1 and 5% free isocyanate groups. While the art is replete in moisture-curable polyurethane coating compositions, some representative systems can be found, for example, in U.S. Pat. Nos. 3,705,132, 3,642,943, 4,469,831, and 3,919 173. Such moisture-curable polyurethane coatings conventionally contain non-aqueous volatile organic solvent systems, pigments, fillers, extenders, additives, flow leveling agents, U.V. stabilizers, and like conventional additives depending upon the precise intended application of the formulation. Such additives certainly are appropriate for the curable composition of the present invention.

Chain extension of the isocyanate-rich reaction mixture (isocyanate index of about 110 to 300) also can be conducted in the presence of the catalyst/co-catalyst system of the present invention. Chain extenders can comprise short-chain diol or glycol extenders, often in combination with long-chain polyols or the like. Short-chain diols most often are alkylene glycols typically ranging from about 2 to 8 carbon atoms in length. Alternatively, the short-chain diols can be reacted with ethylene oxie, propylene oxide, or like alkylene oxides for making polyoxyalkylene polyols. Additionally, triols, tetraols, and the like, typically having an average molecular weight ranging from about 500 to 20,000, can be used as chain extension agents. Examples of long chain polyols can be found in U.S. Pat. Nos. 4,385,133, 3,929,730, 3,993,576, and 4,227,032, for example. Additionally, sucrose and amine-based polyols, and amine-terminated polyoxyalkylene oligomers can be used as chain extension agents.

The following Example shows how the present invention has been practiced, but should not be construed as limiting. In this application, all units are in the metric system and all percentages and proportions are by weight, unless otherwise expressly indicated. Also, all citations set forth herein are expressly incorporated herein by reference.

EXAMPLE

A series of gel times were obtained for various reaction mixtures with and without the presence of triethyl orthoacetate. The reaction mixtures were formed from three different polyisocyanates and a small amount of Pluracol P-410 polyol (a 400 molecular weight polypropylene glycol, BASF Wyandotte Corp.) at an isocyanate index of 120. The catalyst used was the dichloro acetic acid salt of 1,8-diazobicyclo(5.4.0)undec-7-ene (Polycat DBU, Air Products and Chemicals Corp.). This catalyst salt was made by mixing a 1:1 mole ratio of the DBU and dichloro acetic acid together in the Pluracol P-410 polyol at room temperature in a proportion so that one weight part of catalyst salt per 100 weight parts of polyol resulted.

The appropriate level of triethyl ortho acetate was mixed with the appropriate amount of isocyanate to which was added the catalyzed Pluracol P-410 polyol. This reaction mixture was mixed for 30 seconds by mechanical stirring. At 40 seconds from the commencement of mixing, the mixture was poured onto a heated mold. The time to gel was measured from the time at which pouring commenced and the gel samples left on the heated surface for an additional 5 minutes after the termination of the gel point. After the molded plaques were removed from the mold and cooled to room temperature, the samples were flexed to determine toughness. Various experimental conditions and the results recorded are set forth in the table below.

TABLE 1

| Run No. | TEOA* | Isocyanate** | Mold Temp. (°C.) | Gel Time (Sec.) | Comments |
|---|---|---|---|---|---|
| | — | MR | 102 | 170 | Brittle |
| | — | MR | 104 | 117 | Tough |
| | — | MM-103 | 104 | 130–257 | Tough |
| | 3% | MR | 102 | 70 | Tough |
| | 5% | MR | 102 | 70 | Tough |
| | 3% | E-429 | 102 | 79 | Tough |
| | 5% | E-429 | 102 | 86 | Tough |
| | 3% | MM-103 | 102 | 113 | Tough |
| | 5% | MM-103 | 102 | 36 | Tough |

TABLE 1-continued

| Run No. | TEOA* | Isocyanate** | Mold Temp. (°C.) | Gel Time (Sec.) | Comments |
|---|---|---|---|---|---|
| | 3% | MR | 109 | 103 | Tough |

*TEOA is Triethyl orthoacetate
**MM-103 is Lupranate MM103 brand carbodiimide-modified 2.1-functional MDI,- BASF Wyandotte Corp.
E-429 is Mondur E-429 brand polymeric diphenylmethane diisocyanate (60-70% MDI, specific gravity 1.24 at 25° C., bulk density 10.3 lb/gal, Mobay Chemical Corp.)
MR is Mondur MR brand polymeric diphenylmenethane diisocyanate (31.5% NCO content, Mobay Chemical Corp.)

The above-tabulated data demonstrates that effective amounts of an ortho-carboxylic acid ester is effective in providing controlled gel times of an isocyanate trimerization reaction mixture. Additionally, it will be noted that ostensibly complete cure for providing a tough reaction product also was achieved. While the induction period does vary depending upon the type of isocyanate used, as those in the art would expect, controlling the induction time period based upon the amount of co-catalyst present certainly can be seen to be attained in accordance with the precepts of the present invention.

What is claimed is:

1. A method for curing a curable composition which comprises:
    (a) formulating a liquid curable composition comprising an isocyanate-functional compound; and
    (b) admixing said liquid curable composition with a catalyst system comprising an amino catalyst and an orthocarboxylic acid ester.

2. The method of claim 1 wherein said ortho-carboxylic acid ester is selected from the group consisting of ortho-carbonic acid tetraethyl ester, ortho-carbonic acid tetrapropyl ester, ortho-formic acid triethyl ester, ortho-formic acid triisobutyl ester, ortho-formic acid triisopropyl ester, ortho-formic acid trimethyl ester, ortho-formic acid tri(3-methyl butyl) ester, ortho-formic acid triphenyl ester, ortho-formic acid tripropyl ester, ortho propionic acid triethyl ester, and mixtures thereof.

3. The method of claim 1 wherein the proportion of said orthocarboxylic acid ester ranges from between about 0.1 to 20 percent by weight of said liquid curable composition.

4. The method of claim 3 wherein said proportion of orthocarboxylic acid ester ranges between about 3 and 5 percent by weight.

5. The method of claim 1 wherein said amino catalyst is a tertiary amine or quaternary ammonium compound.

6. The method of claim 1 wherein the proportion of said amino catalyst ranges from between about 0.001 and 5 percent by weight of said liquid curable composition.

7. The method of claim 5 wherein the proportion of said amino catalyst range from between about 0.001 and 5 percent by weight of said liquid curable composition.

8. The method of claim 1 wherein said amino catalyst is selected from the group consisting of 1,8-diazobicyclo(5.4.0)undec-7-ene, dimethyl benzyl amine, dimethyl cyclohexyl amine, dimethyl-n-hexyl amine, betahydroxyl ethyl dimethyl amine, pyridine, dodecyl dimethyl amine, N,N-dimethyl cyclohexyl amine, N-methyl pyrrolidine, N-methyl morpholine, and mixtures thereof.

9. The method of claim 8 wherein said amino catalyst comprises 1,8-diazobicyclo(5.4.0)undec-7-ene.

10. The method of claim 2 wherein said amino catalyst is selected from the group consisting of 1,8-diazobicyclo(5.4.0)undec-7-ene, dimethyl benzyl amine, dimethyl cyclohexyl amine, dimethyl-n-hexyl amine, betahydroxyl ethyl dimethyl amine, pyridine, dodecyl dimethyl amine, N,N-dimethyl cyclohexyl amine, N-methyl pyrrolidine, N-methyl morpholine, and mixtures thereof.

11. The method of claim 2 wherein said amino catalyst comprises 1,8-diazobicyclo(5.4.0)undec-7-ene.

12. The method of claim 1 wherein said curable composition additionally comprises an active hydrogen chain extension compound.

13. The method of claim 12 wherein said chain extension compound comprises a polyol.

14. The method of claim 12 wherein the isocyanate index of said curable composition ranges from between about 110 and 300.

15. The method of claim 12 wherein said liquid curable composition comprises two packages which are admixed for their curing, one of said packages comprising said isocyanate-functional compound and said orthocarboxylic acid ester, the second package comprising said chain extension agent and said amino catalyst.

16. The method of claim 1 wherein said isocyanate-functional compound comprises an isocyanate-functional polymer which contains from between about 1 and 5 percent by weight free isocyanate groups.

17. The method of claim 1 wherein said isocyanate-functional compound is selected from the group consisting of hexamethylene diisocyanate, 4,4'-toluene diisocyanate, diphenylmethane diisocyanate, polymethyl polyphenyl isocyanate, m- and p-phenylene diisocyanates, bitolylene diisocyanate, triphenylmethane triisocyanate, tris-(4-isocyanatophenyl)thiophosphate, cyclohexane diisocyanate, bis(isocyanatomethyl)cyclohexane, dicyclohexylmethane diisocyanate, trimethylhexane diisocyanate, trimethyl hexamethylene diisocyanate, dimer acid diisocyanate, isophorone diisocyanate, methyl cyclohexane diisocyanate, 1,5-naphthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and mixtures thereof.

* * * * *